United States Patent
Linde et al.

(10) Patent No.: US 6,803,026 B1
(45) Date of Patent: Oct. 12, 2004

(54) COMPACTED CARBON BLACK PELLETS

(75) Inventors: Günter Linde, Krefeld (DE); Uwe Hempelmann, Meerbusch (DE); Manfred Eitel, Kempen (DE)

(73) Assignee: Bayer Chemicals AG, Leverkusen (DE)

( * ) Notice: Subject to any disclaimer, the term of this patent is extended or adjusted under 35 U.S.C. 154(b) by 0 days.

(21) Appl. No.: 09/646,450

(22) PCT Filed: Mar. 10, 1999

(86) PCT No.: PCT/EP99/01537

§ 371 (c)(1),
(2), (4) Date: Sep. 14, 2000

(87) PCT Pub. No.: WO99/47609

PCT Pub. Date: Sep. 23, 1999

(30) Foreign Application Priority Data

Mar. 18, 1998 (DE) .......................... 198 11 553

(51) Int. Cl.$^7$ .............. C09C 1/00; C01B 31/00
(52) U.S. Cl. .................. 423/449.2; 423/274; 106/472; 106/476; 106/477
(58) Field of Search .............. 423/449.1, 449.2, 423/274; 106/472, 476, 477; 241/3; 23/314; 264/118

(56) References Cited

U.S. PATENT DOCUMENTS

| | | | |
|---|---|---|---|
| 4,946,505 A | 8/1990 | Jungk | 106/712 |
| 5,797,988 A * | 8/1998 | Linde et al. | |

FOREIGN PATENT DOCUMENTS

| | | |
|---|---|---|
| EP | 370 490 | 5/1990 |
| EP | 802 241 | 10/1997 |
| EP | 807 669 | 11/1997 |
| EP | 857 764 | 8/1998 |
| EP | 860 476 | 8/1998 |

OTHER PUBLICATIONS

Ullmann's Encyclopedia of Industrial Chemistry, (date unavailable) vol. A5, fifth edition, p. 148, Carbon, Editors, W. Gerhartz, Y.Yamamoto, F.Campbell, R.Pfefferkorn and J. Rounsaville.

* cited by examiner

Primary Examiner—Steven Bos
(74) Attorney, Agent, or Firm—Godfried R. Akorli

(57) ABSTRACT

This invention relates to carbon black pellets obtained by compaction of carbon black powder in the presence of auxiliary substances, which pellets, despite the compaction, surprisingly exhibit greater color intensity than the powders on which they are based.

11 Claims, No Drawings

COMPACTED CARBON BLACK PELLETS

BACKGROUND OF INVENTION

This invention relates to a process for the production of compacted carbon black pellets for various applications.

By virtue of their small particle size of 0.01 μm to 20 μm, colouring materials are known to have a strong tendency to dust and to be very difficult to dispense due to the strong adhesive forces between the particles. This is overcome by pelletising these powders before use. However, pelletisation often also results in a reduction in dispersibility as the stability of the pellets is usually increased by binders in order to improve transport characteristics. As a result, pigment pellets frequently exhibit lower initial colour intensity, such that, for a given dispersing time, the pellets develop a less intense colour than wherein colouring with powders. The desired advantages of absence of dust and good dispensability have thus resulted in considerable efforts to obtain readily dispersible pellets for pigments too.

This applies in particular to carbon blacks which, due to the small particle size and low bulk density thereof, have always previously undergone compaction as dry powders by "degassing" between vacuum rollers or by "beading" in rotating drums. However, compaction between rollers does not yield pellets and dry pulverization results in agglomeration of the flocculent carbon black into large spherules of up to a few millimetres in diameter. In wet beading, the carbon blacks are pelletised in beading machines using water and possibly binders and then dried. The production of carbon black pellets is described in *Ullmann's Encyclopedia of Industrial Chemistry*, fifth edition, volume A 5, page 148.

U.S. Pat. No. 4,946,505 describes the production of carbon black and pigment pellets for colouring concrete which are obtained by spray pelletisation. The disadvantage of spray pelletisation is that it is necessary to prepare an aqueous slurry of carbon black and vaporisation of the water entails considerable drying costs. U.S. Pat. No. 4,946,505 explicitly excludes compaction and briquetting processes.

DE-A 43 36 548 and DE-A 43 45 168 describe carbon black pellets which are produced with the addition of considerable quantities of water by means of an annular die press, subsequent rounding and drying. The resultant pellets contain less than 1% binder.

EP-A 0 370 490 describes carbon black flakes for printing inks which are produced by compacting carbon black under a low pressure. The material still contains dusting fractions. It is explained that dispersibility suffers if elevated pressure is used.

EP-A-0 802 241 discloses carbon black pellets which have a relative colour intensity relative to the powder on which they are based of at most 100%.

The processes hitherto available either do not yield a satisfactory material or are unfavourable in energy terms due to post-drying.

The object thus arose of providing carbon black pellets which combine mechanical stability with elevated colour intensity as well as a technically simple, low cost process which yields readily dispersible, low dusting carbon black pellets which are stable in transport.

This object is achieved by the carbon black pellets according to the invention: the carbon black powder is compacted to such an extent with the addition of auxiliary substances and subsequently pelletised that the quotient of pycnometric density and bulk density is between 3.0 and 10, preferably between 3.5 and 8. Despite the compaction, the resultant pellets surprisingly exhibit greater colour intensity than the powders on which they are based.

SUMMARY OF THE INVENTION

The present invention accordingly also provides a process for the production of carbon black pellets, in which carbon blacks are compacted with auxiliary substances, in a preferred embodiment twice or more, and commuted to yield pellets, wherein the pellets generally have an average particle size of 0.3 to 2 mm, preferably of 0.5 to 1.0 mm. The quotient of pycnometric density and bulk density of the pellets obtained according to the invention is between 3.0 and 10, preferably between 3.5 and 8.

DETAILED DESCRIPTION OF THE INVENTION

The present invention also related to compacted carbon black pallets having a relative color intensity, based on the uncompacted carbon black powder of greater than 100%.

Compressive forces preferably of between 1 and 100 kN/cm, particularly preferably of between 10 and 30 kN/cm, are used in the compacting stages. The compressive forces may be identical in all the compacting stages, but preferably differ. The product thickness achievable with these compaction units is preferably 1 to 5 mm, in particular 1 to 3 mm. Suitable compaction units are, for example, screws, rollers, die presses, extruders with or without evacuation apparatus.

The pelletisation proceeding after the compaction stages is preferably performed by screen pelletisation. In this case, the fines fraction may be directly separated by screening and recirculated.

It may also be advantageous to increase the size of the fines fraction by pelletisation in a subsequent stage, preferably, for example, by post-rolling on a rotary table or in a rotating drum.

Adding liquid auxiliary substances increases throughput and pressure under given compaction conditions, such that the resultant pellets become stronger.

Particle size distribution measurements show that the use of higher compressive forces clearly results in a breakdown of the carbon black structures. It has accordingly been observed that the pellets produced according to the invention exhibit a greater colour intensity than the corresponding powder mixtures. The application of relatively high pressures and/or repeated compaction also results in greater pellet stability and surprisingly according to the invention simultaneously greater colour intensity.

The particle sizes of the pellets are not essential to the invention; they are generally from 0.3 to 2 mm, preferably from 0.5 to 1.0 mm. The quotient of pycnometric density and bulk density is between 3.0 and 10, preferably between 3.5 and 8.

One or more binders and/or dispersants are used as auxiliary substances. The auxiliary substances may be solid or liquid. It is preferred to use liquid binders from the group comprising polyols, polyethers, polyesters, oils, water and aqueous solutions of polymeric salts or molasses. A dispersant from the group comprising lining sulfonates and naphthalene/formaldehyde condensation products is also preferred.

The total quantity of auxiliary substances is usually 0.1 wt. % to 25 wt. %, preferably 1 to 20 wt. % and particularly preferably 3 to 15 Dvt. %.

The stability of the resultant pellets may subsequently be increased in a further stage by coating them with a thin layer of a material from the group comprising waxes, polyethers, polyesters, polyolefins and polyvinyl alcohols. Preservatives and/or fragrances may additionally be added.

The process according to the invention not only yields free-flowing pellets, but the relative colour intensity in concrete is higher than would be expected on the basis of the quantity of starting material used in powder form.

The carbon black pellets according to the invention are thus particularly suitable for colouring substrates in particular concrete, asphalt, plastics, as well as paints and lacquers.

Method for Assessing the Dispersibility of Pellets in Building Materials

Dispersibility in cement mortar (colour intensity in mortar prisms) of the pellets is determined relative to the powder standard.

Equipment:
 Toni mixer with electronic control
 Mixing container (from Toni-Technik)
 Colorimeter (Minolta CR 310); illuminant C; 0° diffuse with gloss, 8 cm illumination aperture Mortar formulation:
 1200 g 0.2 –1 mm quartz sand
 600 g 1 –2 mm quartz sand
 200 g limestone flour (5 wt. % screening residue on 90 μm screen)
 500 g white cement (Dyckerhoff)
 175 g water (water/cement ratio =0.35)
 6 g pigment pellets Method:
All the mix components are introduced into the mixing container initially without water and premixed while dry. Water and then cement are subsequently added and the mix stirred for 100 seconds.

This mix is placed in a steel die and compression moulded at approx. 300 bar. Directly after compression, the colour of the moist moulding is measured while still in the mould by applying the calorimeter. Measurement is made at four points on the moulding.

Evaluation:
The above-stated method is performed with both the pellet test piece and with the associated powder standard as reference.

The relative colourintensity of the specimens is determined to DIN 55986/A using colour intensity criterion Y.

Particle size was determined on pellets using a Malvem® Mastersizer S.

Measurement of Particle Size with Malvern Mastersizer S

Two different methods, which differed with regard to the intensity of the dispersion process, were used for the dispersion of the substances under investigation. Elevated dispersion energy was achieved by using an ultrasound sonotrode with an input power of 200 W. A ®Labsonic U model ultrasound sonotrode from B. Braun Diessel Biotec was used. 500 mg of the material mixed with the stated quantity of dispersants and additives per 50 ml of distilled water were dispersed for 2 minutes using the ultrasound sonotrode. A setting of an input power of 200 W is used, with the sonotrode impulse controller being set to 0.5. Beaker-type containers having a diameter of approx. 45 mm and a height of 55 mm are used. The sonotrode is immersed approx. 2 cm into the suspension, with care being taken to ensure that the distance from the container walls is as uniform as possible. The entire suspension is introduced into the measurement chamber of the instrument and stirred and pumped at 50% of maximum power during the measurement. An alternative method of achieving low dispersion energies is to use the measuring instrument's internal ultrasound chamber. In this case, 50 mg of the substance under investigation, optionally also together with the stated additives, are placed into the instrument's ultrasound chamber, which is full of distilled water. Ultrasound power is set to 70%; the duration of dispersion is 2 minutes; the other settings remain unchanged. The values stated are the mean of the distribution by volume (D[4.3]) and/or the 10, 50 and 90% percentile values of the distribution by volume (D[v,0.1], D[v,0.5] and D[v,0.9]).

Screen Analysis Using Air Jet Screening Machine

Equipment: 250 μm DIN VA screen (DIN-ISO 3310) Air jet screening machine: Rhewum model LPS 200 MC (4 mm nozzle, 18 rpm, 35 m$^3$/h air, screening time 1 minute)

Method: 20 g of the specimen to be analysed are placed on the screen and then screened with the screening machine. Once screening is complete, the weight of the oversize is determined and the percentage fraction thereof relative to the initial weight calculated.

Draining behaviour:
Draining behaviour is determined to DIN 53 211 using a drain cup (100 ml volume, 6 mm drain nozzle).

The following Examples describe the invention without limiting it.

Test Series 1

®Flammruβ 101 (lampblack, commercial product of Degussa) was vigorously mixed in a plough bar mixer (from Lödige, Paderbom) with various quantities of polyethylene glycol ®PEG 400 (commercial product of EC-Dormagen) and ammonium lining sulfonate (commercial product of Lignotec, Düsseldorf).

These mixtures were compacted in up to 3 compacting operations or also degassed in a vacuum press and compacted in a single stage using a model CS25 unit from Bepex, Leingarten.

The material was coarse-ground in a model MGI 314 coarse grinder from Frewitt with a 1.5 mm mesh screen and separated from the fines fraction using a model ®Conflux 323 μm mesh screen from Siebtechnik, Müihlheim. Table 1 below summarises the test conditions and results. Free-flowing, non-dusting, irregularly shaped pellets having an elevated relative colour intensity were obtained.

Test Series2

Mixtures of Flammruβ 101 were produced as in test series 1 with differing quantities of auxiliary substances, degassed in a vacuum press and compacted using compactor CS 25 and a precompaction screw with a strongly tapered section. Table 2 summarises the test conditions and results. Where auxiliary substances were used, stable pellets having improved relative colour intensity were obtained.

As the quantity of auxiliary substances increases, not only do the compressive forces established increase after the compression operation, but so too do bulk density, yield, stability and relative colour intensity (Table 2).

Comparative Tests

At very low compressive forces or without auxiliary substances, bulk densities remain low wherein yield and relative colour intensity are lower (Table 2).

TABLE 1

| | Additive | Compressive force (kN/cm) | Bulk density (g/cm³) | Relative colour intensity in concrete**) (%) | Particle size distribution D (4.3) μm | Pycnometric density/bulk density | Throughput (kg/h) |
|---|---|---|---|---|---|---|---|
| Powder | | | 0.18 | | 3.90 | 10.1 | |
| Pellet, 1st pass | 2.5% PEG/2.5% ALS | 5 | 0.25 | 93 | — | 7.1 | 43 |
| Pellet, 2nd pass | 2.5% PEG/2.5% ALS | 18 | 0.34 | 117 | 0.78 | 5.4 | 75 |
| Pellet, 3rd pass | 2.5% PEG/2.5% ALS | 24 | 0.40 | 126 | 0.66 | 4.6 | 92 |
| Pellet, 1st pass | 10% PEG/2.5% ALS | 9 | 0.33 | 113 | — | 5.5 | 53 |
| Pellet, 2nd pass | 10% PEG/2.5% ALS | 25 | 0.46 | 125 | 0.73 | 4.0 | 132 |
| Pellet* | 10% PEG/2.5% ALS | 23 | 0.49 | 123 | 0.76 | 3.7 | 89 |
| Pellet* | 10% PEG/5% ALS | 23 | 0.46 | 123 | 0.73 | 4.0 | 82 |

*previously degassed with ® Vacupress
**measured against powder mixture
PEG = polyethylene glycol
ALS = ammonium lignin sulfonate

TABLE 2

| | Additive composition | (%) | Compressive force (1) (kN/cm) | Throughput CS 25 (kg/h) | Bulk density (g/cm³) | Pycnometric density/bulk density | Over-size (%) | Drain time (s) | Relative colour intensity in concrete (%) | Stability (2) | Particle size distribution D (4.3) μm |
|---|---|---|---|---|---|---|---|---|---|---|---|
| Powder | | | | | 0.18 | | | | 100 | | 3.90 |
| Pellet 1 | 10% PEG/5% ALS | 15 | 20 | 143 | 0.43 | 4.2 | 50.2 | 33 | 137 | 3 | 0.82 |
| Pellet 2 | 6.7% PEG/3.3% ALS | 10 | 16 | 133 | 0.38 | 4.8 | 45.3 | 34 | 143 | 3 | 0.77 |
| Pellet 3 | 3.4% PEG/1.6% ALS | 5 | 13 | 84 | 0.33 | 5.5 | 42.6 | 33 | 129 | 2 | 0.74 |
| Pellet 4 | 2% PEG/1% ALS | 3 | 9 | 70 | 0.29 | 6.2 | 47.0 | 33 | 116 | 1 | 0.98 |
| Comparative test | no additives | 0 | 3 | approx. 10** | 0.25 | 7.3 | 35.6 | does not flow | 103 | 0 | 3.67 |

**Product flowed very irregularly.
(1) = max. compressive force (after Vacupress) in 1 pass.
(2) = sensory test, values from 0–5 (0 = soft, 5 = hard).

What is claimed is:

1. Carbon black pellets, prepared from uncompacted carbon black powder, having a relative color intensity, based on the uncompacted carbon black powder, of greater than 100% which have been compacted two or more times with different compressive forces and/wherein the pellets comprise one or more binders and/or dispersants in a total quantity of between 0.1 to 25 wt. %. based on the weight of the pellets.

2. The pellets of claim 1 wherein the pellets have an average particle size of 0.3 to 2 mm and a quotient of pycnometric density and bulk density between 3.0 and 10.

3. The pellets of claim 1 wherein the binder comprises a liquid polyol, polyether, polyester, oil, water or an aqueous solution of a polymeric salt or molasses.

4. The pellets of claim 1 wherein the dispersant comprises a lining sulfonate or a naphthalene/fornaldehyde condensation product.

5. A process for the production of carbon black pellets which comprises compacting carbon black two or more times with different compressive forces in the presence of an auxiliary substance in a total quantity of between 0.1 to 25 wt. %, based on the weight of the pellets and comminuting the compacted carbon black to pellets having an average particle size of 0.3 to 2 mm and a quotient of pycnometric density and bulk density between 3.0 and 10.

6. The process of claim 5 comprising using compression forces of between 1 and 100 kN/cm.

7. The process of claim 5 comprising performing the compaction by screws, rollers, die presses or extruders.

8. The process of claim 5, wherein the auxiliary substance is a binder and/or dispersant used in a total quantity of 0.1 to 25% based on the weight of the pellet, and wherein the binder comprises a liquid polyol, polyether, polyester, oil, water or an aqueous solution of a polymeric salt or molasses.

9. The process of claim 8, wherein the dispersant comprises a lining sulfonate and a naphthalene/formaldehyde condensation product.

10. The process of claim 5 comprising coating the resulting pellets with wax, polyether, polyolefin or polyvinyl alcohol.

11. The process of claim 10 comprising adding a preservative and/or fragrance to the wax, polyether, polyolefin or polyvinyl alcohol.

* * * * *

UNITED STATES PATENT AND TRADEMARK OFFICE
CERTIFICATE OF CORRECTION

PATENT NO. : 6,803,026 B1
DATED : October 12, 2004
INVENTOR(S) : Gunter Linde, Uwe Hempelmann and Manfred Eitel It is certified that error appears in the above-identified patent and that said Letters Patent is hereby corrected as shown below:

<u>Title page,</u>
Item [73], Assignee, please delete "Bayer Chemicals AG, Leverkusen (DE)" and insert -- Bayer Aktiengesellschaft, Leverkusen (DE). --.

Signed and Sealed this

Eighth Day of November, 2005

JON W. DUDAS
*Director of the United States Patent and Trademark Office*